United States Patent
Goldfarb et al.

[11] 3,930,321
[45] Jan. 6, 1976

[54] QUESTION AND ANSWER GAME

[76] Inventors: Adolph E. Goldfarb, 4614 Monarca Drive, Tarzana, Calif. 91356; Erwin Benkoe, 17965 Medley Drive, Encino, Calif. 91316

[22] Filed: Feb. 10, 1975

[21] Appl. No.: 548,831

[52] U.S. Cl. ............................ 35/9 R; 273/139
[51] Int. Cl.² ................... G09B 3/06; A63F 3/00
[58] Field of Search .................. 35/9 R, 9 C, 48 R; 273/130 R, 130 B, 130 D, 130 E, 136 C, 136 E, 137 AB, 137 AD, 137 AC, 139, 134 GM, 134 A

[56] References Cited
UNITED STATES PATENTS

| | | | |
|---|---|---|---|
| 2,889,634 | 6/1959 | Bringmann | 35/9 C |
| 2,970,385 | 2/1961 | Bringmann | 35/9 C |
| 3,061,313 | 10/1962 | Greene | 273/139 |
| 3,177,595 | 4/1965 | Yonker et al. | 35/9 C |
| 3,729,198 | 4/1973 | Shaffer | 273/139 |
| 3,747,229 | 7/1973 | Harte | 35/9 R |
| 3,797,830 | 3/1974 | Breslow | 273/134 A |

*Primary Examiner*—Anton O. Oechsle
*Assistant Examiner*—Harry G. Strappello
*Attorney, Agent, or Firm*—Robert M. Ashen; Robert J. Schaap

[57] ABSTRACT

A game, primarily designed for preschool children, which includes a game board having a plurality of apertures located in the game board. Selected ones of the apertures have a first type of upstanding peg located within the aperture and the others of the apertures have a second type of upstanding peg within the aperture; the first pegs are longer, but the pegs and apertures are arranged to disguise the difference between the longer and shorter pegs. A card, or similar substrate, with questions on the top thereof can be disposed over the game board and this card or substrate will have a plurality of apertures therein capable of being aligned with certain of the apertures in the game board to provide multiple choice answers. A probe, or stylus, may be inserted in the apertures of the card and into the apertures of the game board. In the event that the player of the game inserts the stylus or probe into an aperture of the game board having the longer peg, the player will have selected an aperture corresponding to a correct answer. This peg of the first type is located to be inserted into the stylus to actuate a display member on the stylus such that the player of the game will recognize the selection of a proper answer in the multiple choice possibilities. In this way, visual and mechanical means are provided on the stylus or probe to indicate the correct answer. Moreover, the playing board is designed and the cards are designed with respect to the playing board so that a number of different cards with different questions and possibilities of answers are located at different positions on the cards.

11 Claims, 7 Drawing Figures

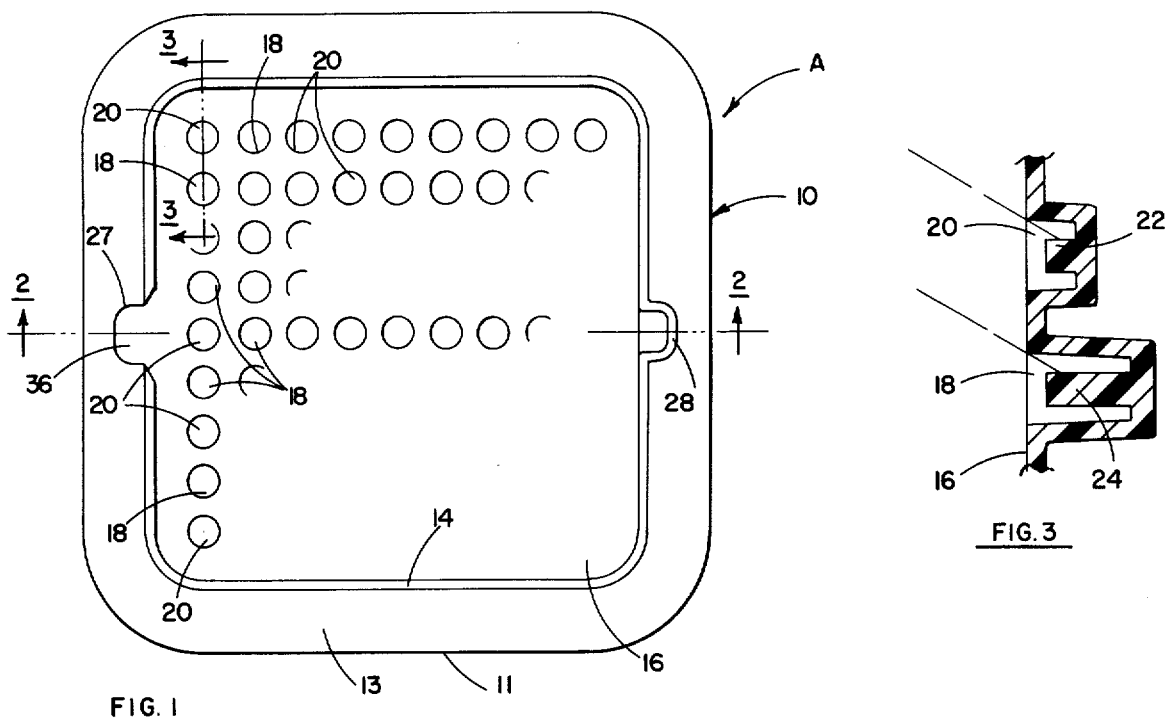
FIG. 1
FIG. 3
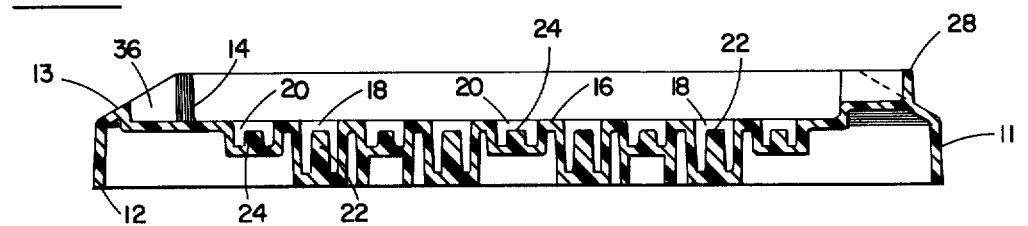
FIG. 2
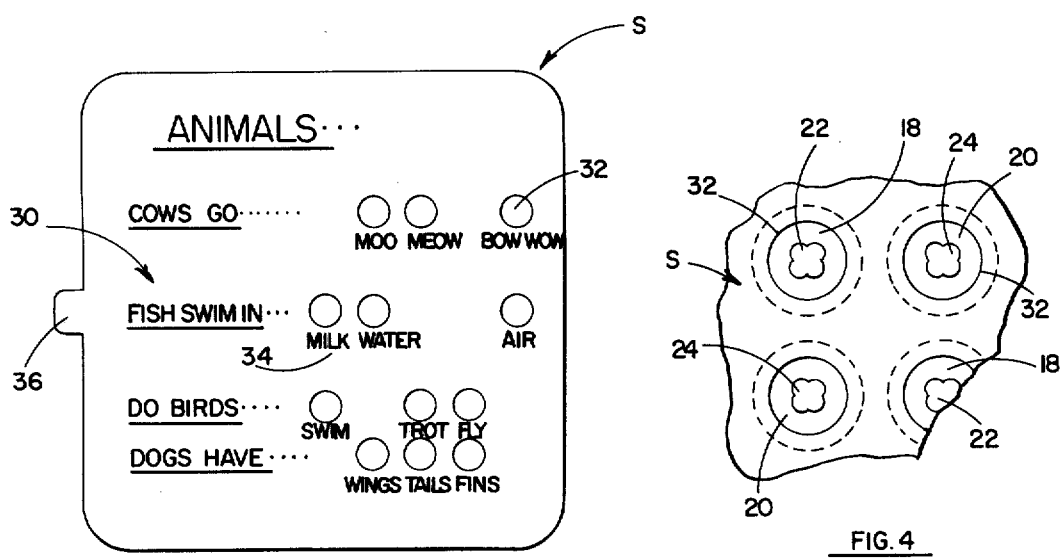
FIG. 5
FIG. 4

QUESTION AND ANSWER GAME

This invention relates in general to certain new and useful improvements in interrogating type games and, more particularly, to a question and answer game which employs a game board operable with a plurality of question and answer substrates such that a number of substrates may be located in various desired positions with respect to the game board.

In recent years, there have been a number of toy playing games, of both educational and entertainment value, which employ a game board and a substrate operable with the game board, as well as a stylus cooperating with the substrate and the game board. In each of these games, one or more questions are presented on the substrate and the player of the game is required to insert the stylus through an aperture in the substrate, corresponding to an aperture in the game board, which depicts the right answer. Generally, several possible answers are provided for each of the questions and, hence, at least one aperture is provided for each of the answers. Thus, in order for the player of the game to select the right answer, he must examine the possible answers associated with the question on the game board, and thereafter insert the stylus into the aligned apertures of the substrate and game board in order to determine if the player has selected the right answer.

While this form of playing game is certainly effective to provide both educational and entertainment value, it is limited in that each of the substrates which may be provided with one or more questions are only locatable on the game board in one selected position. Consequently, the player of the game can learn the proper aperture position associated with the right answer, as opposed to examining and intellectually determining the right answer, and this not only destroys the educational value of the game, but diminishes the entertainment value as well for the player. Inasmuch as these games are directed to preschool children, these games have only short effectiveness, due to the fact that the child can rather quickly determine the proper aperture associated with each question on each substrate. The child can determine the proper aperture by merely memorizing the selected aperture for each question which thereby diminishes the educational value of the game, and the entertainment value as well.

In addition to the foregoing drawbacks of the presently available question and answer games, these games usually employed an electrically operable stylus. Thus, a light or other electrically energizable visual indicator would be energized by completion of an electrical circuit when the player selected the correct answer. Consequently, this form of correct answer indication materially increased the cost of manufacture and hence the attendant retail price of the game.

The present invention obviates these and other problems in the provision of a game board which has a large number of apertures located therein and only certain of the apertures are effective to provide a correct answer to the questions presented on the substrate. Moreover, a number of substrates are provided with the game board of the present invention and each one of these substrates is located in only one selected orientation on the game board. However, each of the substrates may differ in the selected orientation so that one substrate will be oriented differently with respect to another substrate. Nevertheless, each such substrate provides a question and a plurality of answers with indicia representing the proper aperture. However, in this case, the proper aperture will vary upon orientation of any one of the substrates so that the player of the game cannot easily remember the desired aperture position.

For example, a substrate may have five questions listed on a left-hand portion thereof. Each question may have, for example, five multiple-choice answers associated with the question in alignment with the question, and each answer will have an aperture associated therewith which is in alignment with an aperture in the game board. However, only one of the five apertures will represent a correct answer, e.g. aperture number 3. In the present invention, another substrate could be reoriented 90° or 180° and the other aperture, e.g. aperture number 2, could represent a correct answer.

The game of the present invention is new and unique in that the game board will have a substantially greater number of apertures than the substrate. In this way the substrate could have the apertures thereon located in various arrangements so that a player could not learn the correct position of an aperture in the game board corresponding to a correct answer.

The stylus or probe of the present invention is also completely mechanically activatable thereby avoiding the necessity of electrical circuitry to provide electrically energizable visual indicators.

In the game of the present invention, the pegs in the various apertures in the game board have a similar size in cross section and generally a similar shape. Those apertures of the of the game board representing a correct answer generally have a deeper recess and hence a peg of greater vertical dimension. However, the player of the game cannot visually examine the game board and thereby detect which of the game board apertures have a greater depth and which therefor represent the correct answer.

When the stylus is inserted into an aperture having a shorter peg, a shiftable element in the stylus will not be actuated. However, when the stylus is inserted in an aperture having a larger peg, the shiftable element in the stylus will be actuated by the peg and thereby provide visual indication of a correct answer.

It is, therefore, the primary object of the present invention to provide a toy playing game which involves memory and entertainment and which employs a probe insertable into an aperture in a substrate disposed over a playing board.

It is another object of the present invention to provide a toy playing game of the type stated which presents questions on the substrate and a plurality of apertures on the substrate with answers associated with the question, and only one of which answers and the associated aperture represent a proper answer.

It is a further object of the present invention to provide a toy playing game of the type stated which cannot be easily memorized by the player thereof so that the toy playing game always provides an element of challenge and hence retains its educational as well as entertainment value.

It is an additional object of the present invention to provide a toy playing game of the type stated which can be manufactured at a relatively low unit cost and which is highly reliable and durable in its construction.

It is yet another salient object of the present invention to provide a method of instructing children with a high degree of educational value.

With the above and other objects in view, our invention resides in the novel features of form, construction, arrangement and combination of parts presently described and pointed out in the claims.

Having thus described the invention in general terms, reference will now be made to the accompanying drawings in which:

FIG. 1 is a top plan view of a playing game board forming part of the playing game and which is constructed in accordance with and embodies the present invention;

FIG. 2 is a vertical sectional view taken along line 2—2 of FIG. 1;

FIG. 3 is a fragmentary vertical sectional view taken along line 3—3 of FIG. 1;

FIG. 4 is an enlarged fragmentary top plan view of a portion of the game board of FIG. 1 and showing the interior construction of the apertures formed therein;

FIG. 5 is a top plan view of the substrate which is used in conjunction with the game board of FIG. 1;

Figures 6, 7:
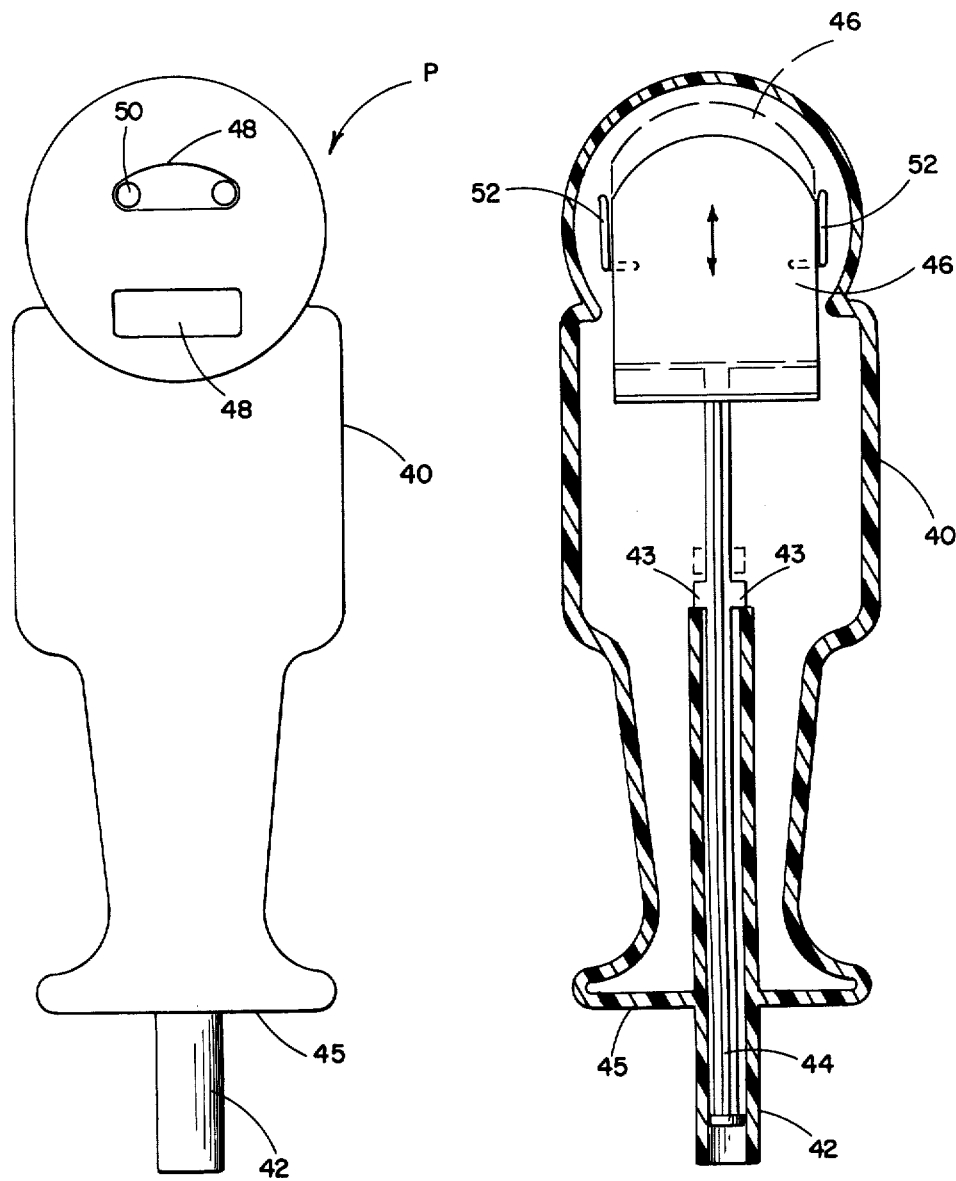
FIG. 6 is a front elevational view of a probe which is used in combination with the game board and the substrate of FIGS. 1 and 5.
FIG. 7 is a vertical sectional view showing the interior of the probe of FIG. 6.

Referring now in more detail and by reference characters to the drawings which illustrate a preferred embodiment of the present invention, A designates a game board forming part of a toy educational and entertainment game and which comprises a rectangularly shaped frame 10 having vertically disposed side walls 11 which form a base margin 12 which may be used for supporting the game board A upon a table or similar substrate.

The vertically disposed walls 12 integrally merge at their upper ends into upward and inwardly inclined top walls 13 which are integrally formed with a downwardly struck peripherally extending lip 14. The lip 14, in turn, integrally merges into a further vertically recessed interior playing surface 16 surrounded by the frame 10, in the manner as illustrated in FIGS. 1 and 2 of the drawings.

The playing surface 16 is provided with a series of first apertures 18 and a series of second apertures 20. Each of the first apertures 18 has a first type of upstanding pin 22 located therein, and each of the second apertures 20 has a second type of upstanding pin 24 located therein. Moreover, the first apertures 18 alternate with the second apertures 20 so that in the quadrilaterally located matrix of FIG. 1 each first aperture is spaced apart from another first aperture 18 by means of a second aperture 20, and which is more fully illustrated in FIGS. 2 and 3 of the drawings.

Referring to FIG. 2, it can be observed that the pin 22 in each of the first apertures 18 is located in a much deeper recess than the pins 24 in the apertures 20. In addition, though not necessary for the purposes of the present invention, the pin 22 may have a smaller diametral size than the pin 24 located in each of the second apertures 20. Moreover, the base wall of each of the second apertures 20 is relatively shallow compared to the base wall in each of the apertures 18.

Some of the base walls in the second apertures 20 could be provided with downwardly extending sleeves if desired. These sleeves would extend below the base margin and will be so located to form the support for the playing board A. Thus, the lower margins of the sleeves could engage a table surface or other supporting surface.

The structure of the pins 22 and 24 is more fully illustrated in FIG. 4 of the drawings. It can be observed that the pins are formed of non-uniform cross section. Thus, the pins are constructed with integrally formed quadrilaterally located arcuate recesses as illustrated.

The player of the game cannot easily visually examine the various apertures 18 and 20 to determine which of such apertures have a greater depth. In this connection, the apertures and pins are sized and located so that these apertures 18 corresponding to a correct answer are essentially disguised from those apertures 20 which do not correspond to a correct answer. More particularly, the pins 22 and 24 have a cross-sectional dimension which covers a major portion of the diametral size of the apertures 18 and 20, respectively. Further, by reference to FIGS. 2 and 3, it can be observed that the pins 22 and 24 have upper ends which are located slightly below the surface 16 of the game board. In addition it can also be observed that the pins 22 and 24 terminate at the same elevation even though the pins 22 have a greater length. Thus when the player of the game examines the various apertures 18 and 20, it is difficult to determine oprically the depth of the apertures. The human eye essentially does not have sufficient resolution to determine the depth of the apertures when viewing the apertures with a line of sight coaxially with the apertures. Even when the player tilts the game board so that the line of sight would follow the dotted lines illustrated in FIG. 3, the base of the aperture is not within the line of sight and the viewer then can still not detect the depth of the aperture. In this way the sizes of the pins are effectively disguised.

The game board A may be constructed of any of a number of moldable plastic materials, such as polystyrene, polyethylene, polybutadiene and the like, and which may be formed in any of a number of known plastic molding operations, such as thermo-forming, blow-molding, injection molding, etc. Notwithstanding, it should be recognized that this game board A could be constructed of other materials including wood, lightweight metals, such as aluminum, or any of a number of other known materials.

As indicated previously, the playing surface 16 is defined by the rectangularly shaped lip 14 and is recessed with respect to the upper surface of the top walls 13 forming part of the frame 10. Consequently, the playing surface 16 is defined by four rectangularly located inwardly presented side walls defining the lip 14, in the manner as illustrated in FIGS. 1 and 2 of the drawings. It can be observed that two of the opposed and parallel walls forming the lip 14 and associated top walls 13 are provided with arcuately shaped recesses 27 and 28, respectively, for reasons which will presently more fully appear.

FIG. 5 more fully represents a top plan view of a substrate S, often referred to as a "playing card" which may be used with the game board A. The substrate S may also be formed of any of the aforementioned plastic materials, or otherwise the substrate S may be formed of a conventional paperboard material or the like. It can be observed that the substrate S is provided with approximately the same size and shape as the playing surface 16 and is designed to fit within the side walls forming the lip 14. For this purpose, the substrate S is also rectangular in shape. In this respect, the lip 14 and the substrate S may be provided with an arcuate corner margin on each of the four corner portions thereof which reduces the possibility of injury arising from sharp corners.

One portion of the substrate is provided with at least one question, and the substrate S, as illustrated in FIG. 5 of the drawings, is provided with a series of questions designated by reference numeral 30. Each of these questions has a possible multiple choice answer, as for example three multiple choice answers. Naturally, only one of the answers is correct. However, each of the answers associated with each of the questions 30 is represented by an aperture 32 in the substrate. Each of the apertures 32 may be similarly provided with indicia, represented by reference numeral 34, associated with the aperture to provide indication of the correct answer.

The player of the game will look at the indicia associated with each of the apertures 32 and attempt to select the correct answer. Thus, if the question asks, for example, perhaps in declarative form "A fish swims in," the indicia associated with each of the apertures 32 would recite "milk" with the first aperture, "water" with the second of the apertures, "air" with the third of the apertures, etc., and which in this case would obviously represent a correct answer for the second aperture 32. Each of the apertures 32 associated with the following questions 30 on the substrate S would also have one correct answer. In this way, the player of the toy playing game would examine the indicia which may be in written or pictorial form or other form and select the proper answer by picking the associated aperture 32 with that answer.

The playing card S is provided on its left-hand end margin, reference being made to FIGS. 1 and 5, with a first integrally formed outwardly struck planar tab 36 which is designed to fit in the recess 27. This tab 36 serves as a locating tab so that the player of the game can insert the playing card S on the playing surface 16 in a proper orientation. The playing card S is linear on its opposed and parallel end margin thereof. In this way, a player may insert his finger in the recess 28 to engage and remove the playing card S.

In order to determine whether the player has selected the correct answer, a probe P is provided and which is more fully illustrated in FIGS. 6 and 7 of the drawings. The probe P, often referred to as a stylus, comprises an outer body 40 which also may be molded from any of the aforementioned plastic materials in any of the aforementioned operations. In the particular embodiment illustrated herein, the probe P adopts the characterization, somewhat of a human individual, although the probe P could adopt any form of characterization.

The probe P includes at the lower end of the housing 40, a probing arm 42 which is sized and shaped to be inserted within the apertures 32 of the substrate S, as well as the apertures 18 and 20 of the game board A. The probing arm 42 is generally hollow in its construction and includes a shiftable rod 44 inserted therein. In this case, the probe 42 is sized and shaped and so located in the housing 40 so that the rod 44 can only be engaged when the probing arm 42 is inserted within one of the first apertures having the pin 22 formed therein. In the event that the probing arm 42 is inserted in such aperture 18, the elongated and diametrically reduced pin 22 will engage the shiftable rod 44 and urge the same upwardly within the housing 40. A bottom wall 45 on the housing 40 will engage the playing surface 16 when the arm 42 is completely inserted in an aperture 18. As this occurs, the shiftable rod 44, which carries a shied 46 at its upper end, will shift upwardly.

A plurality of apertures 48 are formed on the body of the probe 40 so that a pictorial design 50, in the form of eyes in this case, located on the shield 46 will appear in the apertures 48 of the body 40 when the shiftable rod 44 is shifted upwardly. In this way, the probe will provide visual indication to the player of the game that he has selected the proper aperture. However, in the event that the player of the game selects one of the apertures 20 with the upstanding pin 24, the probing arm 42 will not engage the bottom of the aperture 20 and, therefore, the pin 24 will not shift the shiftable arm 44 upwardly. In this way, by examining the head of the probe, the player of the game can recognize that he did not select the proper aperture. Conversely, the player of the game will recognize that he has selected the proper aperture in the event that the indicia 50 on the shield 46 appears in the eyes 48.

In the same respect, it should be observed that any other form of visual indication could be provided with respect to the probe body 40 and the shield 46. For example, the probe body 40 could be provided with one elongated aperture having a color on the shield so that if a different color appeared through an aperture in the body 40, the player would recognize that he has achieved the proper aperture and hence has selected the proper answer with respect to the question asked on the substrate S.

One of the unique features of the present invention is that any of a number of substrates S could be provided with the playing board A. In this case, each of the substrates would have the tab 36 along a different margin so that one substrate could be oriented in a position other than another substrate. In this way, the player of the game could not recognize the proper aperture 18 in which to insert the probe P through the action of memory. Nevertheless, each of the substrates S would have at least one aperture for each question represented by indicia 32 which would be alignable with the proper aperture 18 having the pin 22 therein. Consequently, a wide variety of substrates S could be provided with the playing board A and probe P of the present invention.

The game board is provided with a substantially greater number of apertures 18 and 20 than the amount of apertures which are provided in the various substrates. Generally there are at least twice the number of total apertures in the game board than the substrates and preferably three times the number of apertures in the game boards than in each of the substrates. In this way a substrate may have three apertures in a row where the first aperture in the row may correspond to a correct answer. By merely shifting the three apertures in another substrate by one aperture distance the first aperture in that row of the other substrate would correspond to a wrong answer whereas the next aperture may correspond to a correct answer. In this way, any matrix of apertures may be provided in any one substrate such that they will not correspond with associated apertures in the game board in the same positional relationship as the matrix of apertures in another substrate.

The rod 44 is limited in its movement by means of a pair of limit bosses 43 formed on the rod 44 and which are capable of engaging the top wall of the tube 42 in the manner as illustrated in FIG. 7 of the drawings. Moreover, the upper limit of movement of the rod 44 could also be governed by its engagement with the top wall of the housing 40 which may be in the form of a head, as illustrated in the particular embodiment of FIGS. 6 and 7. In actuality, the upper limit of movement of the rod 44 is regulated by the size of the pin 22 in the aperture 18. A pair of brackets 52 are formed in the housing 40 and serve as guides for the shield 46.

A spring (not shown) could also be disposed about the rod 44 to bias the same downwardly, if desired. However, the present invention permits downward movement of the rod 44 and hence the shield by means of gravity force. Any limit means could be used to limit the downward movement of the rod 44. In this case, the brackets 52 engage flanges 54 on the shield 46 to limit the lowermost limit of travel of the rod 44.

When the player of the game wishes to determine whether the player can answer any of the questions on the substrate S, the player will select one of the several substrates S which are provided with the game board A. Proper orientation of the substrate S can be accomplished by locating the tab 36 in the arcuate recess 27 on the game board A. Thereafter, the player can read the question presented by the indicia 30 and any one of the proper apertures 32 following the indicia 30. When the player believes that the proper answer has been selected, the player will insert the probe arm 42 of the probe P into the selected aperture 32 associated with that particular indicia 30. If the player has selected an improper aperture 32, the arm 42 will extend into one of the apertures 20 where the pin 24 will not shift the rod 44. However, if on the other hand, if the player has selected a proper aperture which provides the proper answer to the question raised by the indicia 30, the player will have inserted the probe into an aperture 18 where the pin 22 will shift the arm upwardly and thereby provide visual indication of the selection of a proper answer.

It should be understood in accordance with the present invention, that the probe could be provided with any form of mechanical actuation to provide visual indication of selection of a proper answer. Any form of mechanically shiftable member could be operatively associated with the probe P so that upon proper contact with a pin 22 in the player board A, a visual indication could be provided to indicate to the player that the player has indeed selected the proper answer.

Thus there has been illustrated a unique and novel toy playing game of educational and entertainment value and which therefore fulfills all of the objects and advantages sought therefor. It should be understood that many changes, modifications, variations and other uses and applications could be made with respect to the subject playing game by those skilled in the art after considering this specification and the accompanying drawings. Therefore, any and all such changes, modifications, variations and other uses and applications are deemed to be covered by the invention which is limited only by the following claims.

Having thus described our invention, what we desire to claim and secure by letters patent is:

1. A toy playing game of educational and entertainment value comprising:
   a. a playing board,
   b. said playing board having a plurality of apertures formed therein,
   c. certain of said apertures having a first type of pin projecting therein,
   d. the remaining apertures having a second type of pin projecting therein,
   e. a substrate disposable over said playing board and having a plurality of substrate apertures and each of which is alignable with some of the apertures in the playing board,
   f. indicia on one portion of said substrate requiring selection of one or more of the apertures on said substrate to conform to the indicia,
   g. a probe provided with said game board and capable of being inserted through the apertures in said substrate and into the associated and aligned apertures in said game board, and
   h. mechanically shiftable means operatively located within said probe shiftable only upon engagement with said second type of pin to provide visual indication of selection of a proper aperture on said substrate when said probe is inserted into an aperture on said substrate corresponding with an aperture in said game board having said second type of pin projecting therein.

2. The toy playing game of claim 1 further characterized in that the indicia on said substrate are questions, and that answering indicia is associated with each of the apertures on said substrate.

3. The toy playing game of claim 1 further characterized in that a plurality of substrates are provided with the playing board, and each of the substrates have different indicia thereon.

4. The toy playing game of claim 1 further characterized in that a plurality of substrates are proprovided with the playing board, and each of the substrates have different indicia thereon, and a locating means is provided on said game board with cooperating locating means on each of said substrates so that said substrates can be located in only one position on said game board.

5. The toy playing game of claim 4 further characterized in that said locating means on said game board is a recess and the cooperating locating means on said substrate is a tab on at least one end margin of said substrate and capable of fitting into said recess.

6. The toy playing game of claim 4 further characterized in that some of said substrates can be located in different positions on said game board than other of said substrates such that each of said substrates can be located on said game board in a proper position with each of said substrates having at least one aperture therein alignable with an aperture in said game board to provide visual indication of a proper aperture in said game board having a second type of pin projecting therein.

7. The toy playing game of claim 1 further characterized in that said second pins have a different size than said first pins to actuate said probe.

8. The toy playing game of claim 7 further characterized in that said probe has a shiftable member therein which will move only when said probe is inserted in an aperture on said game board having a second type of pin therein.

9. The toy playing game of claim 1 further characterized in that said indicia are questions and individual answers are associated with each of the apertures on said substrate.

10. The toy playing game of claim 1 further characterized in that each of said first and second types of pins have upper surfaces which are located in the same plane and below the plane of the playing board, each of said first and second types of pins also having a width relative to the width of the apertures so that a line of sight of a viewer is effectively prevented from determining the lengths of the pins.

11. A toy playing game of educational and entertainment value comprising:
   a. a playing board,
   b. said playing board having a plurality of apertures formed therein,
   c. certain of said apertures having a first type of pin projecting therein,
   d. the remaining apertures having a second type of pin projecting therein,
   e. each of said first and second types of pins having an upper surface located in the same plane and below the plane at the playing board, each of said first and second types of pins also having a width relative to the widths of said apertures so that a line of sight of a viewer is effectively prohibited to determining the lengths of the pins,
   f. a substrate disposable over said playing board and having a plurality of substrate apertures and each of which is alignable with some of the apertures in the playing board,
   g. the number of first and second apertures in said playing board in total being at least twice the number of apertures in any substrate,
   h. indicia on one portion of said substrate requiring selection of one or more of the apertures on said substrate to conform to the indicia,
   i. a probe provided with said game board and capable of being inserted through the apertures in said substrate and into the associated and aligned aperture in said game board, and
   j. mechanically shiftable means operatively located within said probe to provide visual indication of selection of a proper aperture on said substrate when said probe is inserted into an aperture on said substrate corresponding with an aperture in said game board having said game board having said second type of pin projecting therein.

* * * * *